(12) United States Patent
Bae et al.

(10) Patent No.: US 9,805,184 B2
(45) Date of Patent: Oct. 31, 2017

(54) METHOD OF UNLOCKING AN ELECTRONIC DEVICE BASED ON MOTION RECOGNITIONS, MOTION RECOGNITION UNLOCKING SYSTEM, AND ELECTRONIC DEVICE INCLUDING THE SAME

(71) Applicants: Kwang-Hyuk Bae, Seoul (KR);
Kyu-Min Kyung, Seoul (KR);
Tae-Chan Kim, Yongin-si (KR);
Seong-Yeong Jeong, Daegu (KR);
Shung-Han Cho, Seoul (KR)

(72) Inventors: Kwang-Hyuk Bae, Seoul (KR);
Kyu-Min Kyung, Seoul (KR);
Tae-Chan Kim, Yongin-si (KR);
Seong-Yeong Jeong, Daegu (KR);
Shung-Han Cho, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 115 days.

(21) Appl. No.: 14/636,226

(22) Filed: Mar. 3, 2015

(65) Prior Publication Data

US 2015/0248551 A1 Sep. 3, 2015

(30) Foreign Application Priority Data

Mar. 3, 2014 (KR) ........................ 10-2014-0025039

(51) Int. Cl.
*G06F 21/00* (2013.01)
*H04L 29/06* (2006.01)
(Continued)

(52) U.S. Cl.
CPC ...... *G06F 21/36* (2013.01); *G06F 2221/2151* (2013.01)

(58) Field of Classification Search
CPC . G06F 21/36; G06F 21/316; G06F 2221/2151
See application file for complete search history.

(56) References Cited

U.S. PATENT DOCUMENTS

| 8,219,936 | B2 | 7/2012 | Kim et al. |
| 2006/0284969 | A1* | 12/2006 | Kim ................... G06F 21/316 348/14.01 |

(Continued)

FOREIGN PATENT DOCUMENTS

| CA | EP 2506609 A1 * | 10/2012 | ............ H04M 1/673 |
| JP | 2012168802 A | 9/2012 | |
| KR | 1194883 B | 10/2012 | |

OTHER PUBLICATIONS

Muhammad Shahzad, Alex X. Liu, Arjmand Samuel; "Secure unlocking of mobile touch screen devices by simple gestures: you can see it but you can not do it"; Sep. 2013; MobiCom '13: Proceedings of the 19th annual international conference on Mobile computing & networking; Publisher: ACM; pp. 39-50.*

*Primary Examiner* — David Cervetti
*Assistant Examiner* — Courtney Fields
(74) *Attorney, Agent, or Firm* — Volentine & Whitt, PLLC

(57) ABSTRACT

A method of unlocking an electronic device based on motion recognitions generates motion information by detecting a user's motion, calculates optical flows based on the motion information, converts the optical flows into a code by sorting and grouping the optical flows based on predetermined reference directions, generates a comparison result indicating whether the code is consistent with a predetermined password by comparing the code with the predetermined password, and determines whether to unlock the electronic device based on the comparison result.

14 Claims, 13 Drawing Sheets

(51) Int. Cl.
*G06F 21/36* (2013.01)
*H04W 4/22* (2009.01)
*H04W 12/06* (2009.01)

(56) References Cited

U.S. PATENT DOCUMENTS

| | | | |
|---|---|---|---|
| 2009/0262074 A1* | 10/2009 | Nasiri | A63F 13/06 |
| | | | 345/158 |
| 2012/0188198 A1 | 7/2012 | Jeong et al. | |
| 2012/0237114 A1 | 9/2012 | Park et al. | |
| 2012/0252410 A1 | 10/2012 | Williams | |
| 2013/0191908 A1* | 7/2013 | Klein | G06F 21/36 |
| | | | 726/18 |
| 2014/0115366 A1* | 4/2014 | Joo | G06F 1/06 |
| | | | 713/323 |

\* cited by examiner

T(n)    T(n+1)    T(n+2)

F(n)    F(n+1)    F(n+2)

METHOD OF UNLOCKING AN ELECTRONIC DEVICE BASED ON MOTION RECOGNITIONS, MOTION RECOGNITION UNLOCKING SYSTEM, AND ELECTRONIC DEVICE INCLUDING THE SAME

PRIORITY STATEMENT

This application claims priority under 35 USC §119 to Korean Patent Application No. 10-2014-0025039, filed on Mar. 3, 2014 in the Korean Intellectual Property Office (KIPO), the contents of which are hereby incorporated by reference in their entirety.

BACKGROUND

1. Technical Field

The present inventive concept relates generally to an electronic device such as a smart phone, a smart pad, a tablet PC, etc. that may be electronically locked and unlocked. More particularly, the present inventive concept relates to a method of unlocking an electronic device based on motion recognition, a motion recognition unlocking system for unlocking an electronic device based on motion recognition, and an electronic device including the motion recognition unlocking system.

2. Description of the Related Art

Recently, as the security of an electronic device (e.g., a mobile device) becomes more important, various techniques for unlocking the electronic device have been suggested. For example, the techniques include a technique in which a user inputs a password to an electronic device by pushing a physical button or a touch button of the electronic device to unlock the electronic device, a technique in which a user moves a specific graphic that is displayed on a touch-screen panel of an electronic device to unlock the electronic device, a technique in which a user performs a drag operation on an image that is displayed on a touch-screen panel of an electronic device to unlock the electronic device, and a technique in which a user touches specific graphics (e.g., patterns) that are displayed on a touch-screen panel of an electronic device in a predetermined order to unlock the electronic device.

However, since these techniques require a user to physically touch (or contact) a touch-screen panel of an electronic device, the touch-screen panel may be damaged with the likelihood of such damage occurring increasing as the number of times the user physically touches the touch-screen panel increases. In addition, a visibility of the touch-screen panel may be degraded because fingerprints of the user are left on the touch-screen panel. For this reason, a conventional motion recognition unlocking technique in which a user's motion is recognized (by a sensor of the electronic device such as an accelerometer or gyroscope) and the electronic device is automatically unlocked based on the user motion has been suggested. However, the conventional motion recognition unlocking technique requires a great amount of user motion data. Therefore, electronic devices consume a lot of power and operate at a low speed when performing conventional unlocking techniques. In addition, the unlocking operation is unreliable because a great amount of user motion data must be produced and processed in deciding whether to unlock the electronic device.

SUMMARY

According to an aspect of the inventive concept, there is provided a method of unlocking an electronic device based on motion recognition, which includes generating motion information by detecting user motion, calculating optical flows based on the motion information, converting the optical flows into a code by sorting and grouping the optical flows based on a set of reference directions, generating a comparison result indicating whether the code is consistent with a predetermined password by comparing the code with the password, and determining whether to unlock the electronic device based on the comparison result.

According to another aspect of the inventive concept, there is provided a motion recognition unlocking system which includes a sensor unit configured to generate motion information by detecting user motion, an optical flow calculation unit configured to calculate optical flows based on the motion information, a code generation unit configured to convert the optical flows into a code by sorting and grouping the optical flows based on a set of reference directions, a password storage unit configured to store a password corresponding to information in which the reference directions are arranged along a timeline, a comparison unit configured to generate a comparison result indicating whether the code is consistent with the password by comparing the code with the password, and a control signal generation unit configured to output an unlocking control signal based on the comparison result, the unlocking control signal indicating whether to unlock an electronic device.

According to still another aspect of the inventive concept, there is provided an electronic device which includes a plurality of function modules, a motion recognition unlocking system configured to detect user motion and to determine whether to unlock the electronic device, an application processor configured to control the function modules and the motion recognition unlocking system, a power management integrated circuit configured to provide the function modules, the motion recognition unlocking system, and the application processor with power, and in which the application processor includes a main processor that operates based on a first clock signal and a sub processor that operates based on a second clock signal having an operating frequency that is lower than an operating frequency of the first clock signal and in which the motion recognition unlocking system includes a sensor unit configured to generate motion information by detecting user motion, an optical flow calculation unit configured to calculate optical flows based on the motion information, a code generation unit configured to convert the optical flows into a code by sorting and grouping the optical flows based on a set of reference directions, a password storage unit configured to store a password corresponding to information in which the reference directions are arranged along a timeline, a comparison unit configured to generate a comparison result indicating whether the code is consistent with the password by comparing the code with the password, and a control signal generation unit configured to output an unlocking control signal based on the comparison result, the unlocking control signal indicating whether to unlock the electronic device.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE PREFERRED EMBODIMENTS

Figure 1:
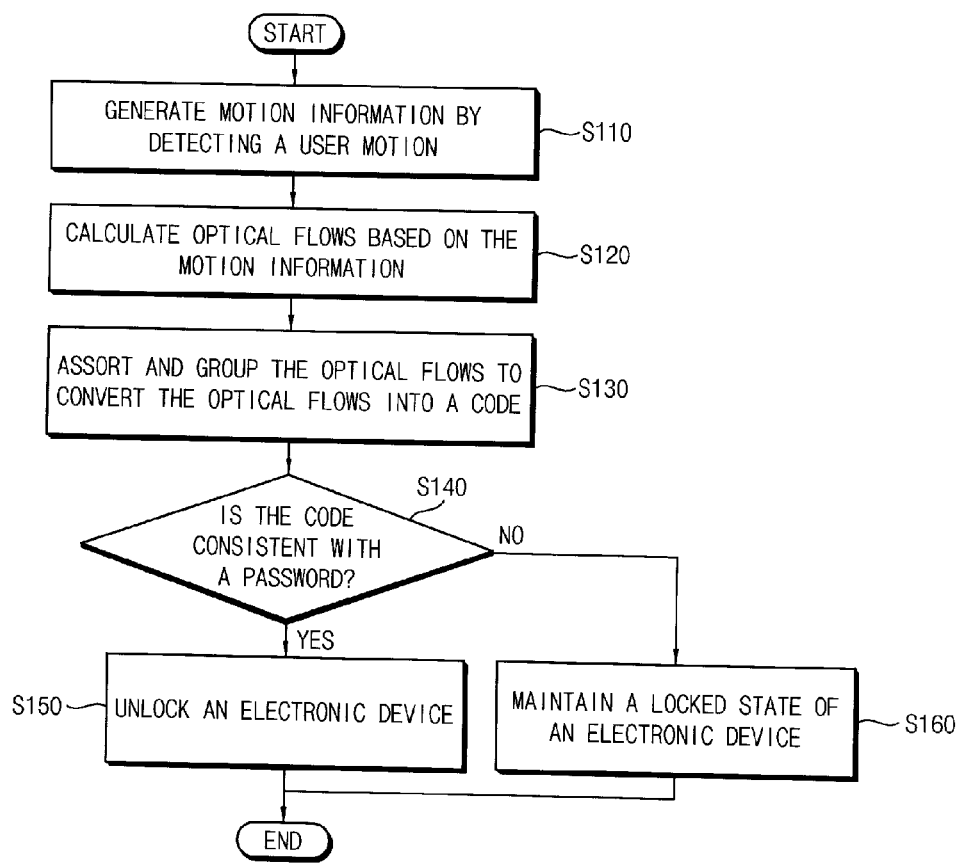
FIG. 1 is a flow chart illustrating an embodiment of a method of unlocking an electronic device based on motion recognitions according to the inventive concept.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that when an element is referred to as being "operatively connected" to another element, it can be directly connected to the other element or intervening elements may be present.

It will be further understood that the terms "comprises", "comprising", "includes" or "including" when used herein specify the presence of stated features, integers, steps, operations, elements, or components but do not preclude the presence or addition of one or more other features, integers, steps, operations, elements, or components.

Figure 2:
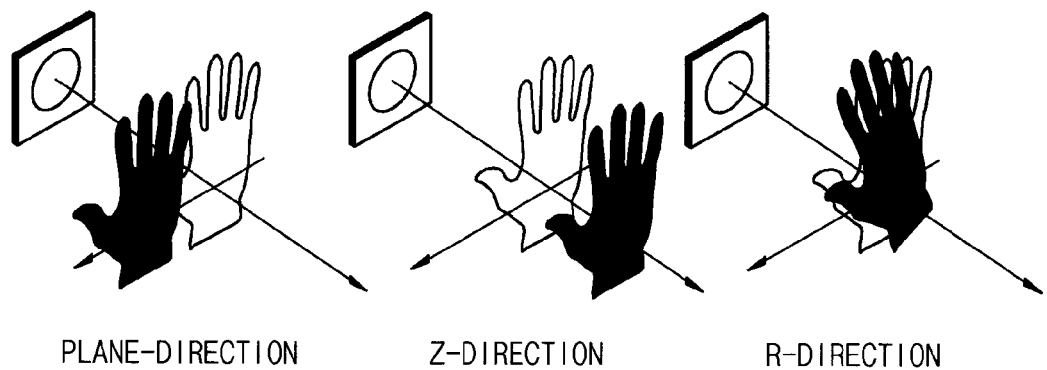
FIG. 2 is a conceptual diagram illustrating examples in which a user's motion is detected in the method of FIG. 1.
Figure 3:
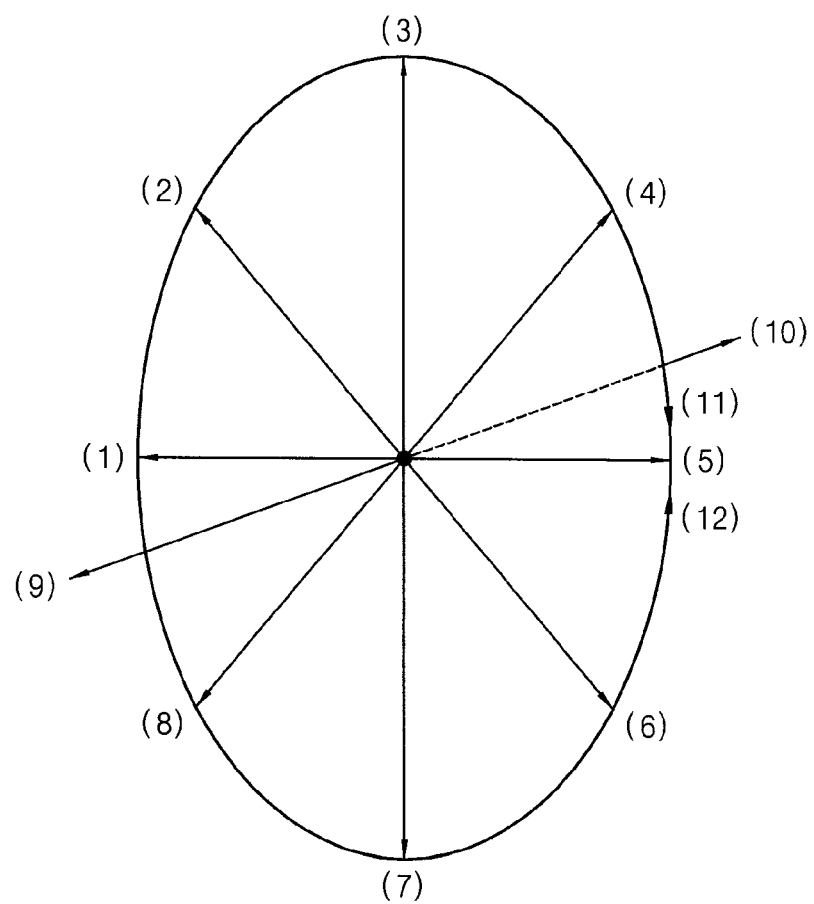
FIG. 3 is a graphic illustrating an example in which optical flows are sorted and grouped based on predetermined reference directions in the method of FIG. 1.

An embodiment of a method of unlocking an electronic device based on motion recognition according to the inventive concept will now be described with reference to FIGS. 1 through 3.

The method may generate motion information by detecting (or capturing) a user's motion (S110), may calculate optical flows based on the motion information (S120), and may sort and group the optical flows based on predetermined reference directions to convert the optical flows into a code (S130). Subsequently, the method of FIG. 1 may check whether the code is consistent with a predetermined password by comparing the code with the predetermined password (S140). When the code is consistent with the predetermined password, the method may unlock an electronic device (S150). On the other hand, when the code is inconsistent with the predetermined password, the method may maintain a locked state of the electronic device (S160). That is, the method may generate a comparison result indicating whether the code is consistent with the predetermined password by comparing the code with the predetermined password, and may determine whether to unlock the electronic device based on the comparison result.

For instance, the motion information generated (S110) from the user motion may represent motion vectors. In an example of this embodiment, the user motion may be detected by a time based optical sensor whose outputs are triggered at certain times, i.e., when certain events that cause changes in a sensing unit of the sensor to occur. In particular, sensing units of a time based optical sensor, corresponding to light receiving elements, each may output motion information any time there is a change in intensity of light detected by the element. Thus, a time based optical sensor (e.g., a dynamic vision sensor) may detect motion in a portion of the subject and output motion information as units of the motion occurring at specified times (delineated by time stamps). Here, the output motion information may include time information (the timestamp) representative of a time at which the change of light intensity occurs, and location information representative of a location at which the change of light intensity occurs in the field containing the subject, etc. That is, the time based optical sensor may generate the motion information in the form of motion vectors each accompanied with a timestamp. In another example, the user motion may be detected by a frame based optical sensor whose output is a series of frames generated at fixed rates and each containing an image of the field containing the subject. In this case, the frame based optical sensor may be a color image sensor, a black and white image sensor or the like of a typical video camera. To this end, the frame based optical sensor may comprise sensing units, corresponding to light receiving elements, that generate the motion information (i.e., the motion vectors) for the frames output by the sensing units.

In another example of this embodiment, the optical sensor (i.e., the time based optical sensor or the frame based optical sensor) may cooperate with a proximity sensor. In this case, the optical sensor may detect the user motion only in a portion of the subject moving within a predetermined distance from the optical sensor. Thus, motion of the subject may be distinguished from motion in the background. In still another example of this embodiment, the optical sensor may operate only when a quantity of events (i.e., an amount of motion of the subject) is greater than a predetermined quantity. In this case, the user motion detected by the optical sensor may be statistically analyzed and only when the analysis reveals that the motion of the subject exceeds a certain degree is the unlocking operation performed.

The optical flows based on the motion information (S120) may be calculated based on a vector operation of the motion vectors (i.e., the motion information). Meanwhile, as illustrated in FIG. 2, the user motion may be analyzed with respect to spatial coordinates (i.e., X-Y-Z coordinates) relative to an imaging surface of the optical sensor. Here, assuming that a coordinate plane that is parallel to the imaging surface of the optical sensor is an X-Y plane, user motion in upper-lower directions in the X-Y plane (e.g., motion along the Y-axis), left-right directions (i.e., motion along the X-axis), and in diagonal directions in the X-Y plane may be referred to as a plane-direction motion (indicated as PLANE-DIRECTION in the figure). In addition, a user motion perpendicular to the X-Y plane (i.e., perpendicular to the imaging surface of optical sensor) may be referred to as a Z-axis direction motion (indicated as Z-DIRECTION in the figure). Further, user motion rotating in the X-Y plane may be referred to as rotational-direction motion (indicated as R-DIRECTION in the figure). Therefore, the optical flows may be calculated based on a vector operation between the motion vectors (i.e., the motion information) having spatial coordinates (i.e., X-Y-Z coordinates). For example, the plane-direction motion may be obtained based on a mean-value operation of the motion vectors. In addition, the Z-axis direction motion may be obtained based on an inner product operation of the motion vectors. Furthermore, the rotational-direction motion may be obtained based on a cross product operation of the motion vectors. However, calculations of the optical flows are not limited thereto.

The optical flows based on the motion information may be converted into the code (S130) first by sorting and grouping the optical flows based on the predetermined reference directions. For example, as illustrated in FIG. 3, assuming that a coordinate plane (i.e., (1), (2), (3), (4), (5), (6), (7), (8), (11), (12)) that is parallel to the imaging surface of the optical sensor is the X-Y plane and that an axis (i.e., (9), (10)) that is perpendicular to the imaging surface of the optical sensor is the Z-axis, the predetermined reference directions may include the X-axis directions (i.e., (1), (5)) in the X-Y plane, the Y-axis directions (i.e., (3), (7)) in the X-Y plane, diagonal directions (i.e., (2), (4) and (6), (8)) in the X-Y plane, rotational directions (i.e., (11) and (12)) in the X-Y plane, and the Z-axis directions (i.e., (9), (10)) perpendicular to the X-Y plane. Although FIG. 3 shows that the predetermined reference directions include twelve directions having four degrees of freedom (DOF), the predetermined reference directions are not limited thereto. For example, the predetermined reference directions may include a different number of directions and may have less than four degrees of freedom.

Once the optical flows are sorted based on the predetermined reference directions, the method of FIG. 1 may group the optical flows. For example, the method of FIG. 1 may assign sub-codes to the optical flows based on their predetermined reference directions over regular time intervals, and group the same sub-codes together over a predetermined period of time corresponding to the time in which the optical sensor is outputting motion information, such that the optical flows (i.e., the sub-codes) are sequentially arranged while grouped together (i.e., in a particular synchronism). In this case, the code of the optical flows includes direction information of the user's motion. This will be shown in and described again later on with reference to FIG. 4.

In another example, the method of FIG. 1 may assign sub-codes to the optical flows based on their predetermined reference directions with each reference direction assigned the same sub-code, but in this case may also temporally and/or spatially correlate the sub-codes before arranging them in a particular synchronism. Thus, the code may include direction information of the optical flows having temporal and/or spatial correlations. For example, in a case in which a user moves his hand once in a left direction (i.e., along the X-axis) in the X-Y plane, the code may include the direction information indicating "left, left, left, left, and left" when the sub-codes assigned to the optical flows are sequentially arranged, i.e., when the sub-codes are arranged along regular time intervals over the time in which the user's hand is moving to the left. However, the direction information indicating "left, left, left, left, left" has a temporal and/or spatial correlation. Therefore, in this example the method of FIG. 1 generates the code by converting the direction information indicating "left, left, left, left, and left" into correlated direction information, i.e., into one correlated sub-code, indicating "left". This will be shown in and described again later on with reference to FIG. 5

The code may then be checked for consistency with the predetermined password by comparing the code with a predetermined password (S140) corresponding to a time-based arrangement of the predetermined reference directions. More specifically, the method of FIG. 1 may compare a sequence of the code with a sequence of the predetermined password, may compare a synchronicity of the code with a synchronicity of the predetermined password, and may generate a first comparison result indicating that the code is consistent with the predetermined password or a second comparison result indicating that the code is inconsistent with the predetermined password based on results of the comparisons.

More specifically, the sequence comparison may be used to generate a sequence result, and a determination may be made as to whether the sequence result is greater than a predetermined sequence-similarity reference value. Likewise, the synchronicity comparison may be used to generate a timing result, and a determination may be made as to whether the timing result is greater than a predetermined timing-similarity reference value. If both determinations are positive, the method of FIG. 1 may generate the first comparison result indicating that the code is consistent with the predetermined password. On the other hand, when the sequence result is smaller than the predetermined sequence-similarity reference value or the timing result is smaller than the predetermined timing-similarity reference value, the method of FIG. 1 may generate the second comparison result indicating that the code is inconsistent with the predetermined password.

This will be shown by and described again later on with reference to FIG. 6.

As mentioned above, the method of FIG. 1 may unlock the electronic device (S150) when the code is consistent with the predetermined password. On the other hand, the method of FIG. 1 may maintain the locked state of the electronic device (S160) when the code is inconsistent with the predetermined password. Specifically, the method of FIG. 1 unlocks the electronic device when the first comparison result indicating that the code is consistent with the predetermined password is generated. On the other hand, the method of FIG. 1 maintains the locked state of the electronic device when the second comparison result indicating that the code is inconsistent with the predetermined password is generated.

As an alternative to comparing the sequence of the code with the sequence of the predetermined password and by comparing the time period of the code with the time period of the predetermined password, the method of FIG. 1 may compare the code with the predetermined password by performing Dynamic Programming (DP) matching. As another alternative, the method of FIG. 1 may compare the code with the predetermined password by using Hidden Markov Model (HMM). Still further, the method of FIG. 1 may compare the code with the predetermined password by using a cross-correlation value between the sequence of the code and the sequence of the predetermined password.

In any case, as is clear from the description above, a method according to the inventive concept performs an unlocking operation, based on motion recognition, for an electronic device in a relatively simple way. Moreover, an electronic device employing the method may perform an unlocking operation at a high speed while consuming low power and the electronic device is prevented from being erroneously unlocked.

Figure 4:
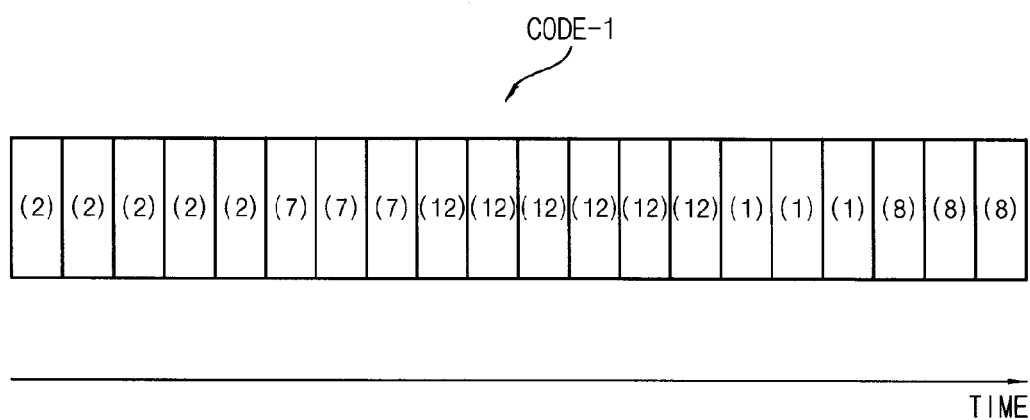
FIG. 4 is a conceptual diagram illustrating an example in which optical flows are converted into a code in the method of FIG. 1.
Figure 5:
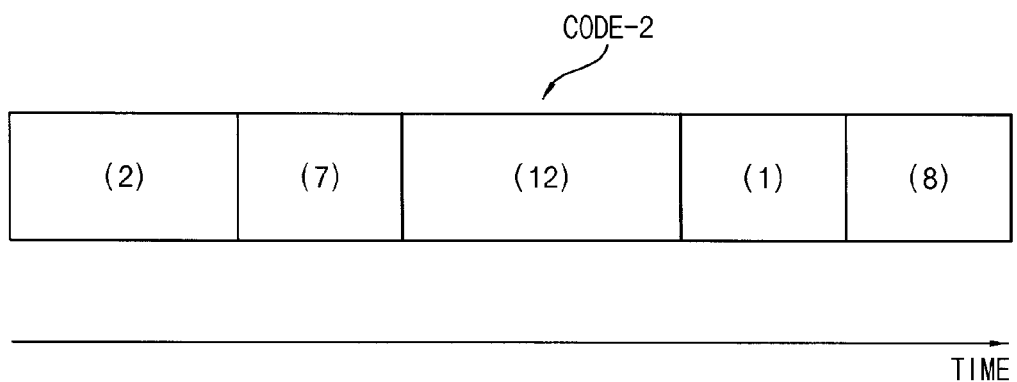
FIG. 5 is a conceptual diagram illustrating another example in which optical flows are converted into a code in the method of FIG. 1.

FIG. 4 is a diagram illustrating an example in which optical flows are converted into a code in the method of FIG. 1. FIG. 5 is a diagram illustrating another example in which optical flows are converted into a code in the method of FIG. 1.

First and second codes CODE-1 and CODE-2 converted from optical flows in the method of FIG. 1 are illustrated in FIGS. 4 and 5, respectively. The first code CODE-1 may be generated by sorting the sub-codes respectively assigned to the optical flows based on predetermined reference directions into groups of the same sub-codes, and by serially arranging the groups of sub-codes, over a predetermined time period. That is, as illustrated in FIG. 4, the first code CODE-1 may include direction information of the optical flows that are stored as sub-codes in the order of: (2), (2), (2), (2), (2), (7), (7), (7), (12), (12), (12), (12), (12), (12), (1), (1), (1), (8), (8), and (8). On the other hand, the second code CODE-2 may be generated by sorting the sub-codes respectively assigned to the optical flows based on the predetermined reference directions into correlated groups each represented by a single correlation sub-code, i.e., by grouping the optical flows (i.e., the sub-codes) in a way in which the sub-codes are temporally and/or spatially correlated, and then serially arranging the correlation sub-codes, over a period of time. In this case, the second code CODE-2 may include direction information of the optical flows that are stored as (temporally and/or spatially correlated) sub-codes in the order of: (2), (7), (12), (1), and (8).

Figure 6:
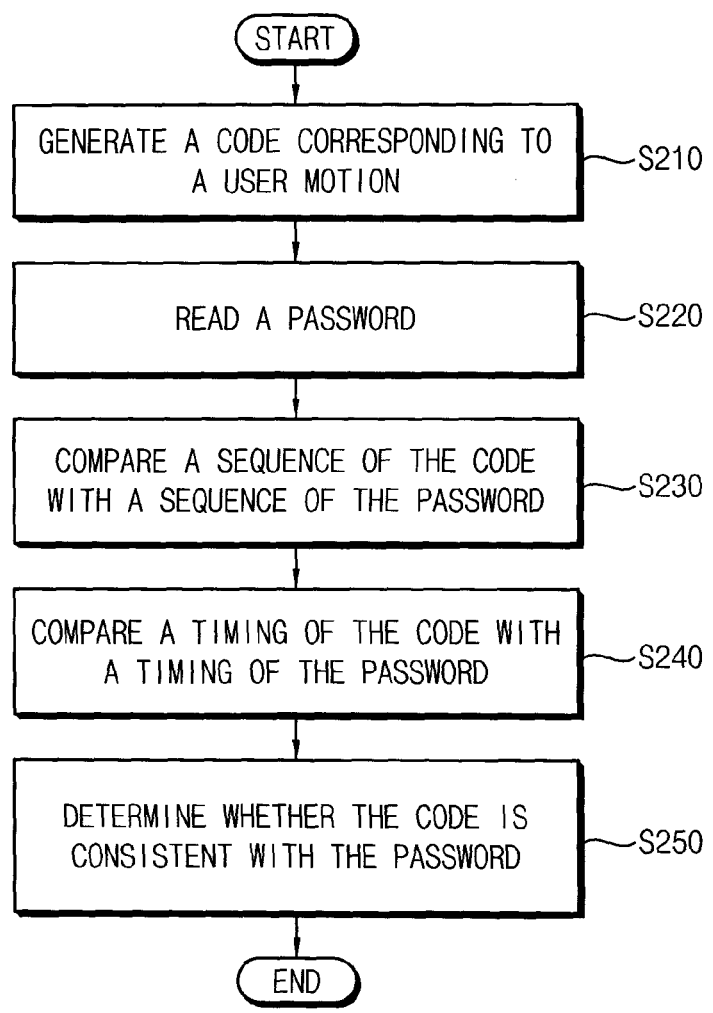
FIG. 6 is a flow chart illustrating a process in which a code is compared with a predetermined password in the method of FIG. 1.
Figure 7:
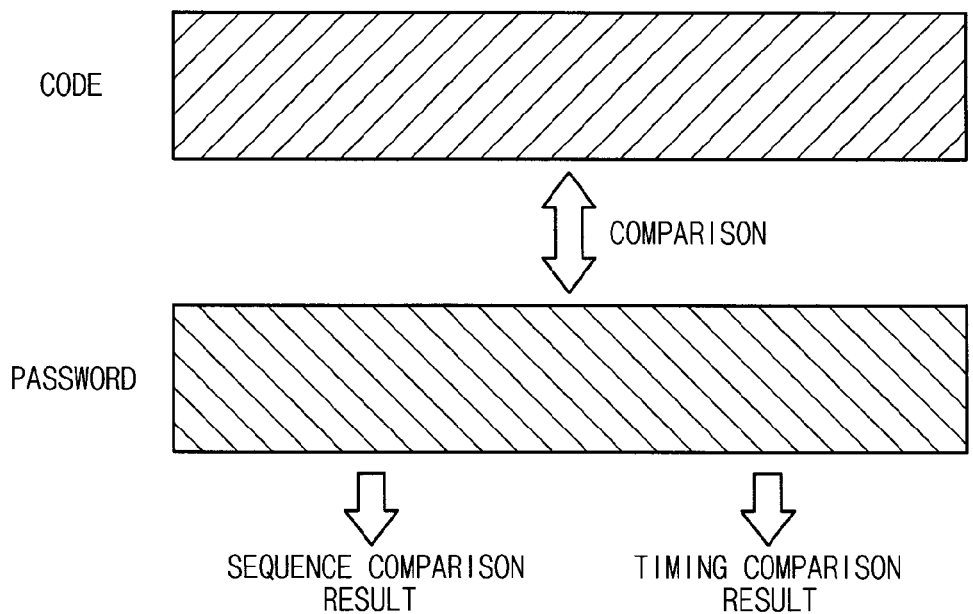
FIG. 7 is a conceptual diagram illustrating an example in which a code is compared with a predetermined password in the method of FIG. 1.
Figure 8:
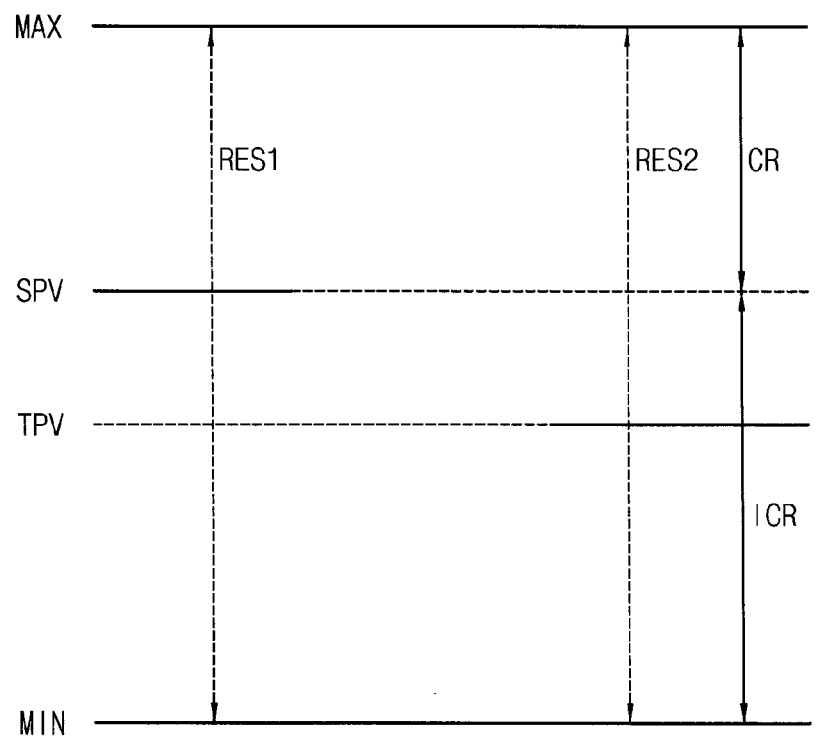
FIG. 8 is a graphic illustrating an example of a comparison result between a code and a predetermined password obtained by the method of FIG. 1.

Referring to FIGS. 6 through 8, the method of FIG. 1 may generate a code corresponding to a user motion (S210) in any of the manners described above, and may read a predetermined password (S220). Subsequently, the method of FIG. 1 may compare a sequence of the code with a sequence of the predetermined password (S230), may compare a synchronicity of the code with a synchronicity of the predetermined password (S240), and may determine whether the code is consistent with the predetermined password based on a sequence comparison result RES1 and a synchronicity comparison result RES2 (S250). Here, as illustrated in FIG. 8, when the sequence comparison result RES1 is greater than a predetermined sequence-similarity reference value SPV and the synchronicity comparison result RES2 is greater than a predetermined timing-similarity reference value TPV, the method of FIG. 1 may determine that the code is consistent with the predetermined password (i.e., indicated as a first region CR). On the other hand, when the sequence comparison result RES1 is smaller than the predetermined sequence-similarity reference value SPV or the synchronicity comparison result RES2 is smaller than the predetermined timing-similarity reference value TPV, the method of FIG. 1 may determine that the code is inconsistent with the predetermined password (i.e., indicated as a second region ICR). Meanwhile, it is illustrated in FIG. 8 that the predetermined sequence-similarity reference value SPV to be compared with the sequence comparison result RES1 is greater than the predetermined timing-similarity reference value TPV to be compared with the synchronicity comparison result RES2. This means that the sequence-similarity is more important than the synchronicity-similarity when the code is compared with the predetermined password to determine whether the code is consistent with the predetermined password. However, the present inventive concept is not limited thereto. In another example (e.g., when the synchronicity-similarity is more important than the sequence-similarity), the predetermined timing-similarity reference value TPV to be compared with the synchronicity comparison result RES2 may be greater than the predetermined sequence-similarity reference value SPV to be compared with the sequence comparison result RES1. As was also described earlier, the inventive concept is not limited to a particular way of comparing the code with the predetermined password. For example, the code may be compared with the predetermined password by performing Dynamic Programming matching. In addition, the code may be compared with the predetermined password by using Hidden Markov Model. Further, the code may be compared with the predetermined password by using a cross-correlation value between the sequence of the code and the sequence of the predetermined password.

Figure 9:
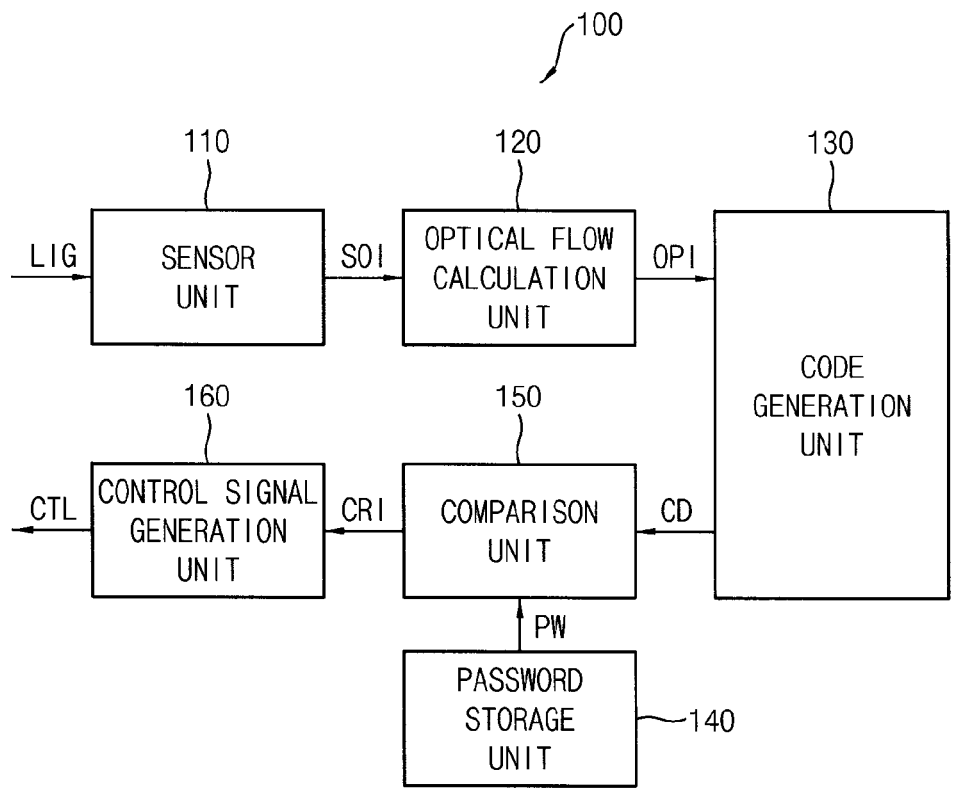
FIG. 9 is a block diagram illustrating a motion recognition unlocking system according to the inventive concept.
Figure 10:
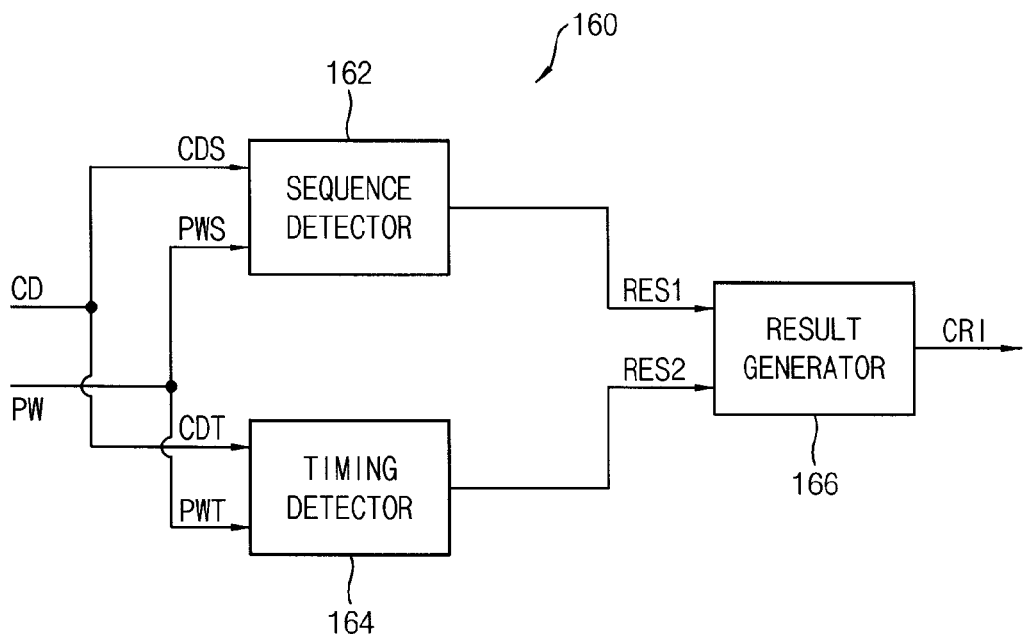
FIG. 10 is a block diagram illustrating an example of a comparison unit of the motion recognition unlocking system of FIG. 9.

FIG. 9 is a block diagram illustrating an embodiment of a motion recognition unlocking system according to the inventive concept. FIG. 10 is a block diagram illustrating an example of a comparison unit of the motion recognition unlocking system of FIG. 9.

Referring to FIGS. 9 and 10, the motion recognition unlocking system 100 may include a sensor unit 110, an optical flow calculation unit 120, a code generation unit 130, a password storage unit 140, a comparison unit 150, and a control signal generation unit 160.

The sensor unit 110 may generate motion information SOI by detecting (or capturing) a user's motion LIG. Here, the motion information SOI may be represented as motion vectors. The sensor unit 110 may include a time based optical sensor (e.g., a dynamic vision sensor which may also be described as an event based sensor) whose outputs are delineated by timestamps indicating the time at which the outputs occur, respectively, or a frame based optical sensor whose outputs are frames each containing an image of the field of view of the sensor unit at the time the frame is produced. In the case of a time based optical sensor such as a dynamic vision sensor, when a change of light intensity is caused by the user's motion, each sensing unit of the sensor compares the change of light intensity with a predetermined threshold value, and outputs a signal (motion-indicating event) when the change of light intensity is greater than the predetermined threshold value.

In either case, the sensor unit 110 may include sensing units, corresponding to light receiving elements, which detect not only incident light but changes in the intensity of the incident light. In an example in which the sensor unit 110 comprises a time based optical sensor, the optical sensor may detect the motion of a portion of the subject which is moving and may output corresponding units of motion information SOI (i.e., the motion vectors) at exactly the time the motion is occurring. Here, each output may include at least one of time information indicative of the time at which the change of light intensity has occurred and location information indicative of the relative location in the field of view at which the change of light intensity has occurred. In an example in which the sensor unit 110 is a frame based optical sensor, the optical sensor may output units of the motion information SOI (i.e., the motion vectors) in frames generated at timed intervals. In some embodiments, the sensor unit 110 may also include a proximity sensor. In this case, the sensor unit 110 may detect the user motion LIG only when a motion of the subject occurs within a predetermined distance form the sensor unit. In some embodiments, the sensor unit 110 may output any motion information SOI when a quantity of events (i.e., a motion of the subject) is greater than a predetermined quantity. To this end, the sensor unit 110 may be configured to statistically analyze the user motion LIG and allow the sensor unit 110 to output the motion information SOI when the results of the statistical analysis are dispositive of a certain amount of motion being performed by the user. The optical flow calculation unit 120 may receive the motion information SOI from the sensor unit 110, and may calculate optical flows OPI based on the motion information SOI. In an example of this embodiment, the optical flows OPI may be calculated based on a vector operation between the motion vectors (i.e., the motion information SOI). In other words, the optical flow calculation unit 120 may calculate the optical flows OPI by performing the vector operation between the motion vectors (i.e., the motion information SOI) represented by spatial coordinates (i.e., X-Y-Z coordinates).

The code generation unit 130 may receive the optical flows OPI from the optical flow calculation unit 120, and may be configured to sort and group the optical flows OPI based on predetermined reference directions to convert the optical flows OPI into a code CD. Examples of this process have been described earlier with reference to FIG. 1 (S130), FIGS. 2-5, and FIG. 6 (S210) and thus, will not be described here again for the sake of brevity.

The password storage unit 140 may store a predetermined password PW corresponding to predetermined reference directions arranged with a certain synchronism. Thus, when the code generation unit 130 converts the optical flows OPI into the code CD by sorting and grouping the optical flows OPI based on the predetermined reference directions, the code CD may be compared with the predetermined password PW stored in the password storage unit 140. The comparison unit 150 may receive the code CD from the code generation unit 130, may read the predetermined password PW from the password storage unit 140, and then may generate a comparison result CRI indicating whether the code is consistent with the predetermined password PW by comparing the code CD with the predetermined password PW. In an example embodiment, as illustrated in FIG. 10, the comparison unit 150 may include a sequence detector 162, a synchronism detector 164, and a result generator 166. The sequence detector 162 may generate a sequence comparison result RES1 by comparing a sequence CDS of the code CD with a sequence PWS of the predetermined password PW. The synchronism detector 164 may generate a synchronism comparison result RES2 by comparing a synchronism CDT of the code CD with a synchronism PWT of the predetermined password PW. The result generator 166 may generate the comparison result CRI indicating whether the code CD is consistent with the predetermined password PW based on the sequence comparison result RES1 and the synchronism comparison result RES2. Here, the comparison unit 150 may generate a first comparison result indicating that the code CD is consistent with the predetermined password PW when the sequence comparison result RES1 is greater than a predetermined sequence-similarity reference value and the synchronism comparison result RES2 is greater than a predetermined timing-similarity reference value. On the other hand, the comparison unit 150 may generate a second comparison result indicating that the code CD is inconsistent with the predetermined password PW when the sequence comparison result RES1 is smaller than the predetermined sequence-similarity reference value or the synchronism comparison result RES2 is smaller than the predetermined timing-similarity reference value. However, the comparison unit 150 is not limited to being configured in this way. For example, the comparison unit 150 may be configured to compare the code CD with the predetermined password PW by performing Dynamic Programming matching. Alternatively, the comparison unit 150 may be configured to compare the code CD with the predetermined password PW by using Hidden Markov Model. Furthermore, the comparison unit 150 may instead be configured to compare the code CD with the predetermined password PW by using a cross-correlation value between the sequence CDS of the code CD and the sequence PWS of the predetermined password PW.

The control signal generation unit 160 may receive the comparison result CRI indicating whether the code CD is consistent with the predetermined password PW from the comparison unit 150, and may output an unlocking control signal CTL indicating whether to unlock an electronic device based on the comparison result CRI. Specifically, the control signal generation unit 160 may output a first unlocking control signal for controlling the electronic device to unlock when the comparison result CRI output from the comparison unit 150 is the first comparison result indicating that the code CD is consistent with the predetermined password PW. On the other hand, the control signal generation unit 160 may output a second unlocking control signal for controlling the electronic device not to unlock (i.e., controlling the electronic device to remain locked) when the comparison result CRI output from the comparison unit 150 is the second comparison result indicating that the code CD is inconsistent with the predetermined password PW. That is, according to the unlocking control signal CTL output from the control signal generation unit 160, the electronic device may be unlocked, or a locked state of the electronic device may be maintained.

As described above, when the motion recognition unlocking system 100 performs the unlocking operation for the electronic device, the motion recognition unlocking system 100 may calculate the optical flows OPI based on the motion information SOI generated by the user motion LIG, may sort and group the optical flows OPI based on the predetermined reference directions to convert the optical flows OPI into the code CD, and may compare the code CD with the predetermined password PW to determine whether to unlock the electronic device. Thus, the motion recognition unlocking system 100 may perform the unlocking operation for the electronic device at a high speed while consuming low power, and may prevent the electronic device from being erroneously unlocked.

Figure 11:
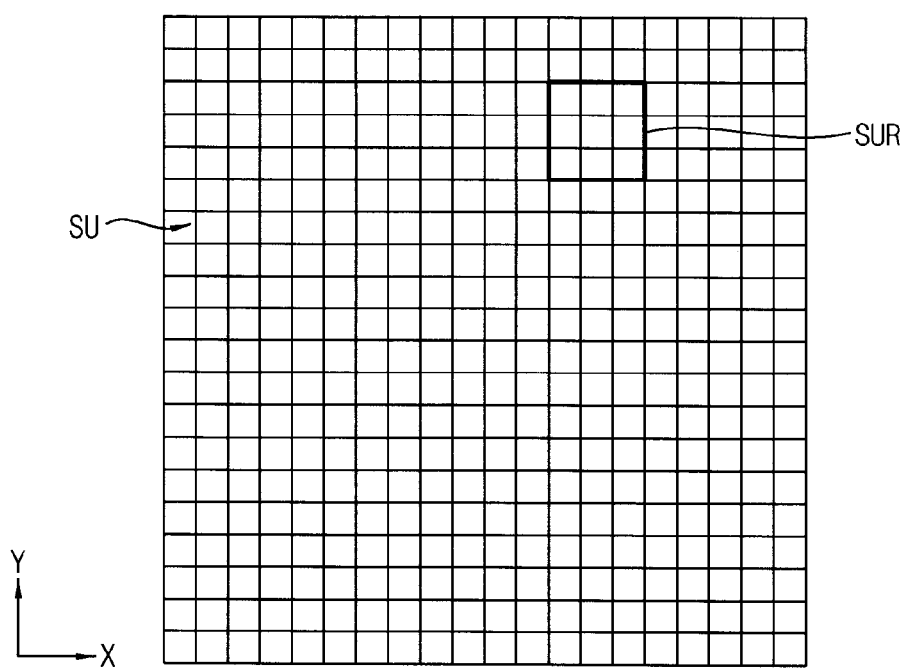
FIG. 11 is a diagram illustrating an example of a sensor unit of the motion recognition unlocking system of FIG. 9.
Figure 12A:
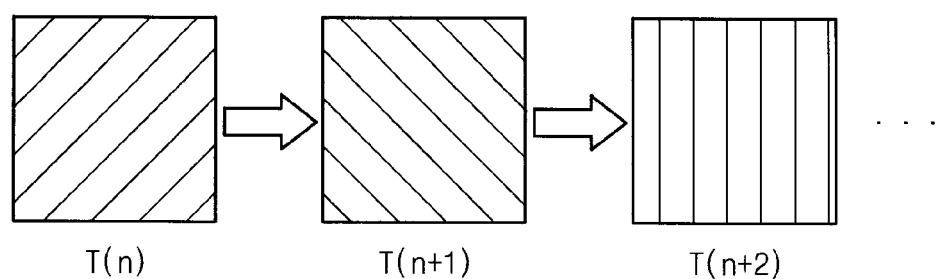
FIGS. 12A and 12B are conceptual diagrams illustrating examples in which motion information is generated by the sensor unit of FIG. 11.
Figure 12B:
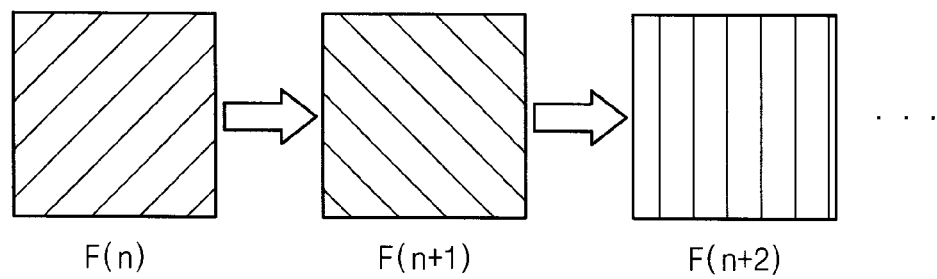

FIG. 11 is a diagram illustrating an example of the basic structure of optical sensor of a sensor unit 110 of the motion recognition unlocking system of FIG. 9. FIGS. 12A and 12B are diagrams illustrating examples of different types of outputs depending on the type of optical sensor having the basic structure of FIG. 11.

Referring to FIG. 11, the sensor unit 110 generates the motion information SOI in the form of data of motion vectors. As illustrated in FIG. 11, an imaging surface of an optical sensor (e.g., a time based optical sensor such as a dynamic visions sensor or a frame based optical sensor) of the sensor unit 110 is designated as an X-Y plane. As described above, the sensor unit 110 may sense changes in light intensity to detect (or capture) a user's motion LIG. For this operation, the sensor unit 110 may include sensing units SU corresponding to light receiving elements each sensing the change of light intensity. Here, the sensing units SU may each be a pixel (i.e., may each correspond to a pixel of the image). In one example, the sensing units SU may be grouped to constitute a sensing field SUR. In this case, information representative of temporal and/or spatial changes of light intensity that are sensed by the sensing units SU may also be obtained. Although FIG. 11 illustrates an example in which the sensing field SUR has a 3×3 matrix of sensing units SU, the sensing field SUR is not limited thereto. Rather, the sensing field SUR may have a q×r matrix shape, where q and r are integers greater than 1.

FIG. 12A shows the case in which the optical sensor having the basic structure of FIG. 11 is a time based optical sensor. In this case, motion is detected based on an event (change in light intensity over a certain threshold), and image-parts generated by the sensing units SU at time intervals T(n), T(n+1), T(n+2), . . . are used to produce the motion information SOI (i.e., the motion vectors). FIG. 12B shows the case in which the optical sensor having the basic structure of FIG. 11 is a frame based optical sensor. In this case, the sensor unit 110 generates image-parts in a series of frames F(n), F(n+1), F(n+2), . . . used to produce the motion information SOI (i.e., the motion vectors).

In either case, the sensor unit 110 may be configured to produce the motion information (SOI) using a correlation based technique that generates the motion vectors based on image-parts having similar correlations, a feature based technique that generates the motion vectors based on image-parts having similar features, a gradient based technique that generates the motion vectors based on image-parts having similar gradients. However, the sensor unit 110 may be configured in other ways to output the motion information SOL Subsequently, the optical flow calculation unit 120 may calculate the optical flows OPI based on the motion information SOI output from the sensor unit 110. Specifically, the optical flow calculation unit 120 may be configured to calculate the optical flows OPI by performing a vector operation between the motion vectors (i.e., the motion information SOI) represented as spatial coordinates (i.e., X-Y-Z coordinates). For example, a plane-direction user motion LIG in the X-Y plane may be calculated by performing a mean-value operation of the motion vectors. In addition, a Z-axis direction user motion LIG may be calculated by performing an inner product operation of the motion vectors. A rotational-direction user motion LIG in the X-Y plane may be calculated by performing a cross product operation of the motion vectors. However, the optical flow calculation unit 120 may be configured in other ways to calculate the optical flows OPI.

Figure 13:
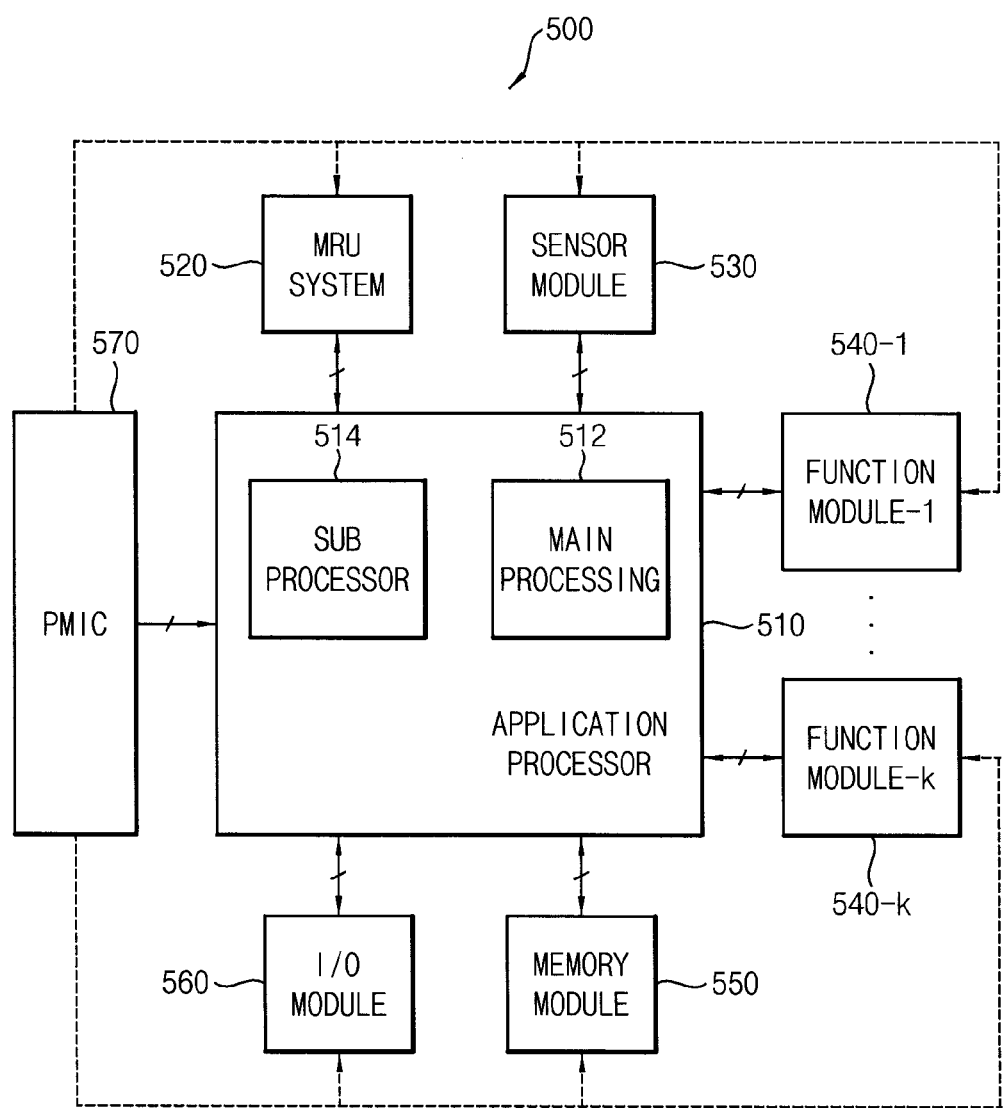
FIG. 13 is a block diagram illustrating an electronic device according to the inventive concept.
Figure 14:
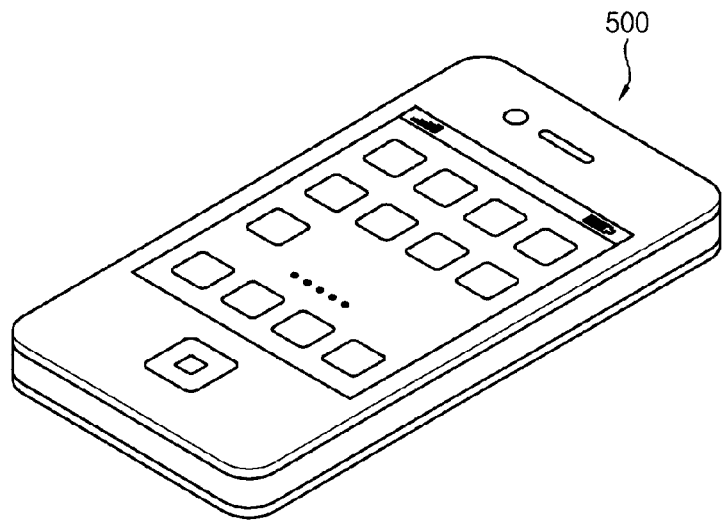
FIG. 14 is a perspective view of a smart phone as an example of the electronic device of FIG. 13.

FIG. 13 is a block diagram illustrating an electronic device according to the inventive concept. FIG. 14 is of a smart phone diagram as an example of the electronic device of FIG. 13.

Referring to FIGS. 13 and 14, the electronic device (e.g., smart phone) 500 may include an application processor 510, a motion recognition unlocking system 520, at least one sensor module 530, a plurality of function modules 540-1 through 540-k, a memory module 550, an input/output (I/O) module 560, and a power management integrated circuit (PMIC) 570. However, the electronic device 500 is not limited thereto. For example, the electronic device 500 may be implemented as a computer, a laptop, a digital camera, a video camcorder, a cellular phone, a smart phone, a video phone, a smart pad, a tablet PC, an MP3 player, etc.

The application processor 510 may control an overall operation of the electronic device 500. That is, the application processor 510 may control the motion recognition unlocking system 520, the sensor module 530, the function modules 540-1 through 540-k, the memory module 550, the I/O module 560, and the power management integrated circuit 570. In an example of this embodiment, the application processor 510 includes a main processor 512 (i.e., a high performance processor) that operates based on a first clock signal and a sub processor 514 (i.e., a low performance processor) that operates based on a second clock signal of which an operating frequency is lower than an operating frequency of the first clock signal. In an example of a configuration of electronic device 500, in an active mode of the electronic device 500, only the main processor 512 may operate in the application processor 510. In this case, the main processor 512 may perform both main functions and sub functions of the electronic device 500. For example, the main processor 512 may control the motion recognition unlocking system 520, the sensor module 530, the function modules 540-1 through 540-k, the memory module 550, the I/O module 560, and the power management integrated circuit 570. In another example of a configuration of electronic device 500, in the active mode of the electronic device 500, both the main processor 512 and the sub processor 514 may operate in the application processor 510. In this case, the main processor 512 may perform main functions of the electronic device 500 (e.g., control the function modules 540-1 through 540-k), and the sub processor 514 may perform sub functions of the electronic device 500 (e.g., control the motion recognition unlocking system 520, and the sensor module 530). However, the main functions and the sub functions of the electronic device 500 may be set in various ways according to requirements for the electronic device 500.

In still another example of configurations of the electronic device 500, in a sleep mode of the electronic device 500, only the sub processor 514 may operate in the application processor 510. That is, the main processor 512 of the application processor 510 may be powered-off in the sleep mode of the electronic device 500. Generally, in the sleep mode of the electronic device 500, the main functions of the electronic device 500 may not be performed. Thus, operating the main processor 512 in the sleep mode of the electronic device 500 may be inefficient in terms of power. For this reason, in the sleep mode of the electronic device 500, only the sub processor 514 may perform the sub functions of the electronic device 500 (e.g., control the motion recognition unlocking system 520, and the sensor module 530). As a result, unnecessary power consumption may be prevented (or, reduced) in the sleep mode of the electronic device 500. Meanwhile, in the active mode of the electronic device 500, the power management integrated circuit 570 may provide the application processor 510, the motion recognition unlocking system 520, the sensor module 530, the function modules 540-1 through 540-k, the memory module 550, and the I/O module 560 with power. On the other hand, in the sleep mode of the electronic device 500, the power management integrated circuit 570 may provide the application processor 510 (i.e., the sub processor 514), the motion recognition unlocking system 520, and the sensor module 530 with power to perform only the sub functions of the electronic device 500 (e.g., to control the motion recognition unlocking system 520, and the sensor module 530).

The motion recognition unlocking system 520 is of a type shown in and described above with reference to FIG. 9 and thus, will not be described in detail for the sake of brevity. Moreover, as described above, the motion recognition unlocking system 520 may be controlled by the sub processor 514 of the application processor 510 when an operating mode of the electronic device 500 is the sleep mode. Thus, unnecessary power consumption may be prevented (or reduced) in the sleep mode of the electronic device 500. In addition, the motion recognition unlocking system 520 may be controlled by the main processor 512 and/or the sub processor 514 of the application processor 510 when the operating mode of the electronic device 500 is the active mode.

The sensor module 530 may perform various sensing operations. Here, the sensor module 530 may include a gyro sensor that measures rotational speed, an acceleration sensor that measures speed and momentum, a geomagnetic field sensor (compass), a barometer that measures altitude, a gesture-proximity-illumination sensor module that performs various operations such as motion recognition, proximity detection, and luminance detection, a temperature-humidity sensor that measures temperature and humidity, and a grip sensor that determines whether the electronic device 500 is gripped by a user. However, the sensor module 530 is not limited to the kinds and/or numbers of sensors listed above.

The function modules 540-1 through 540-k may perform various functions of the electronic device 500. For example, the electronic device 500 may include at least one of a communication module that performs a communication function (e.g., code division multiple access (CDMA) module, long term evolution (LTE) module, radio frequency (RF) module, ultra wideband (UWB) module, wireless local area network (WLAN) module, worldwide interoperability for microwave access (WIMAX) module, and a camera module that functions as a camera. The electronic device 500 may further include at least one of a global positioning system (GPS), a microphone (MIC), and a speaker. However, the electronic device 500 is not limited to having any particular number or type of function modules.

The memory module 550 may store data for operations of the electronic device 500. The memory module 550 may be included in the application processor 510. For example, the memory module 550 may include a volatile semiconductor memory device such as a dynamic random access memory (DRAM) device, a double data rate synchronous dynamic random access memory (DDR SDRAM) device, a static random access memory (SRAM) device, or a mobile DRAM and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, or a ferroelectric random access memory (FRAM) device. The memory module 550 may further include a solid state drive (SSD), a hard disk drive (HDD), or a CD-ROM.

The I/O module 560 may include a touch panel or other display.

As described above, the electronic device 500 including the motion recognition unlocking system 520 may provide a user with a high-performance unlocking interface. In addition, since the electronic device 500 prevents the electronic device 500 from being erroneously unlocked, reliability and security of the electronic device 500 may be improved.

Figure 15:
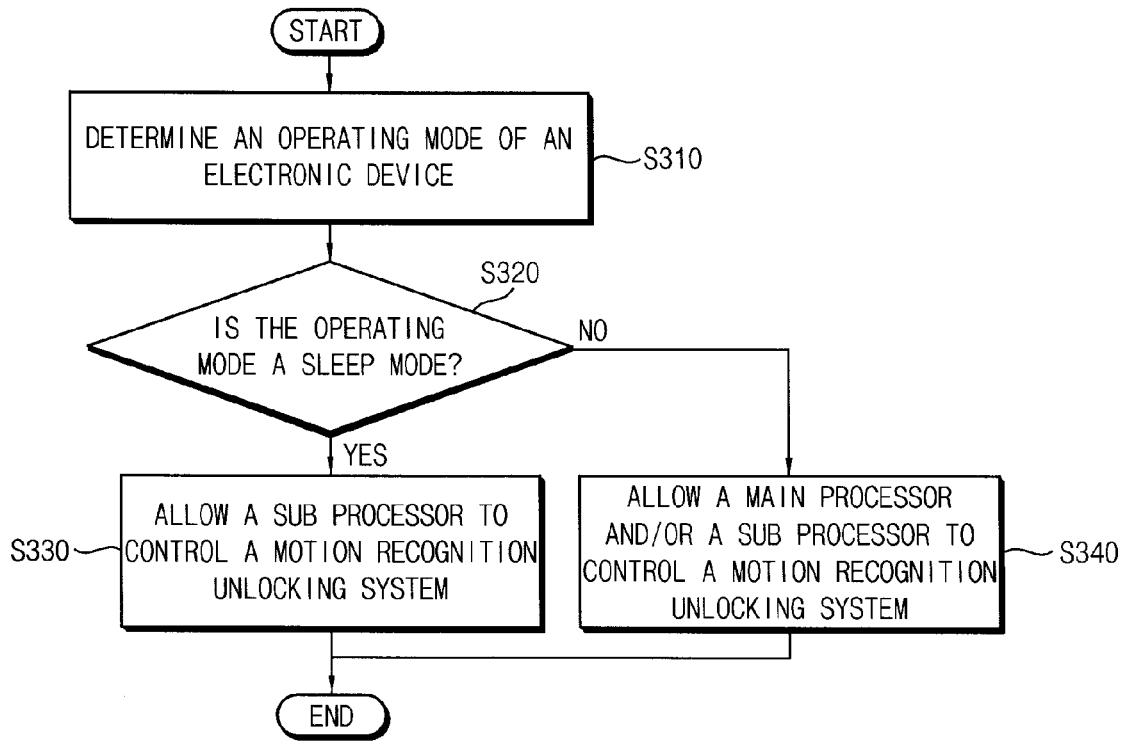
FIG. 15 is a flow chart illustrating a process in which a motion recognition unlocking system is controlled according to operating modes of the electronic device of FIG. 13.
Figure 16:
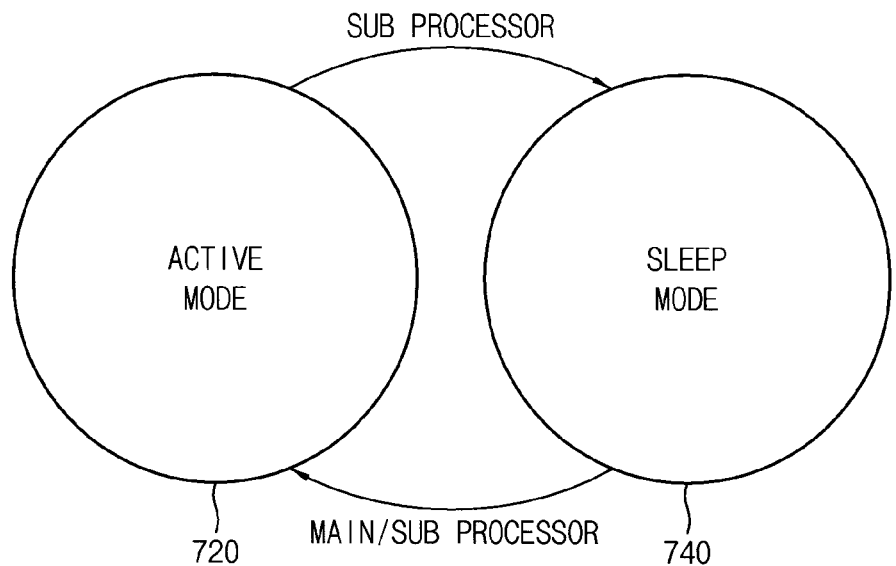
FIG. 16 is a conceptual diagram illustrating an example in which a motion recognition unlocking system is controlled according to operating modes of the electronic device of FIG. 13.

FIG. 15 is a flow chart illustrating a process in which a motion recognition unlocking system is controlled according to operating modes of the electronic device of FIG. 13. FIG. 16 is a diagram illustrating an example in which a motion recognition unlocking system is controlled according to operating modes of the electronic device of FIG. 13.

FIGS. 15 and 16 illustrate that the motion recognition unlocking system 520 is controlled by the main processor 512 or the sub processor 514 of the application processor 510 according to operating modes of the electronic device 500. Specifically, when the operating mode of the electronic device 500 is determined (S310), it may be checked whether an operating mode of the electronic device 500 is a sleep mode 740 (S320). Here, when the operating mode of the electronic device 500 is the sleep mode 740, the sub processor 514 of the application processor 510 may control the motion recognition unlocking system 520 (S330). On the other hand, when the operating mode of the electronic device 500 is not the sleep mode 740 (i.e., when the operating mode of the electronic device 500 is an active mode 720), the main processor 512 and/or the sub processor 514 of the application processor 510 may control the motion recognition unlocking system 520 (S340).

For example, assuming that the electronic device 500 is a smart phone, the active mode 720 of the electronic device 500 may correspond to an operating state in which a specific application program is executed on a display device, and the sleep mode 740 of the electronic device 500 may correspond to an operating state in which a specific application program is not executed on the display device (e.g., the display device is turned off). Therefore, since the motion recognition unlocking system 520 is controlled by the sub processor 514 of the application processor 510 when the operating mode of the electronic device 500 is the sleep mode 740, a user may unlock the smart phone through his or her motion without changing the operating mode of the smart phone from the sleep mode 740 to the active mode 720 (e.g., without turning on the display device of the smart phone). However, the present inventive concept is not limited thereto. In addition, although it is described above that operating modes of the electronic device 500 include the active mode 720 and the sleep mode 740, operating modes of the electronic device 500 may further include a power-off mode as long as the motion recognition unlocking system 520 can operate in the power-off mode (e.g., the power-off mode may be included in the sleep mode 740 of the electronic device 500).

Figure 17:
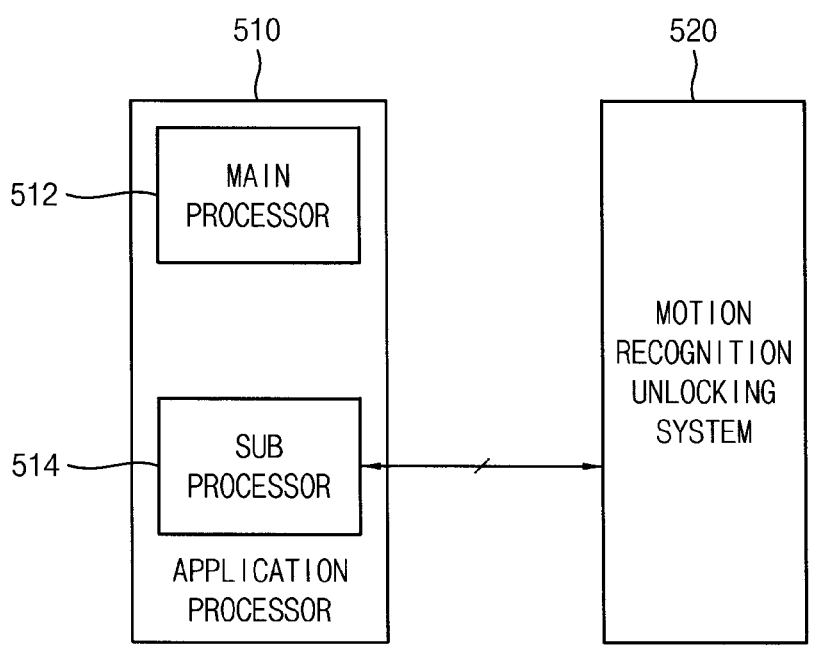
FIG. 17 is a block diagram of a motion recognition unlocking system of the electronic device of FIG. 13 and illustrating an example of a sleep mode of the system.
Figure 18:
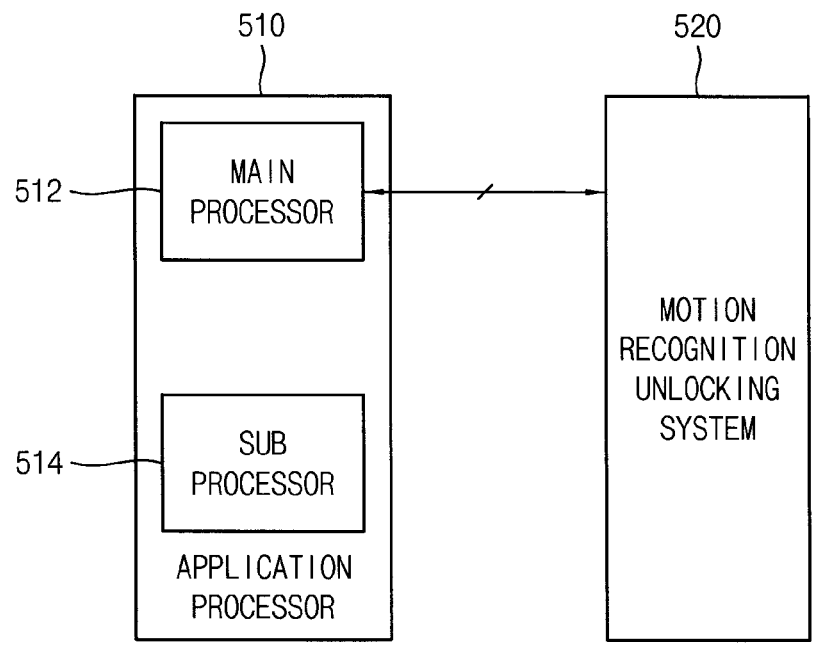
FIG. 18 is a block diagram of a motion recognition unlocking system of the electronic device of FIG. 13 and illustrating an example of an active mode of the system.
Figure 19:
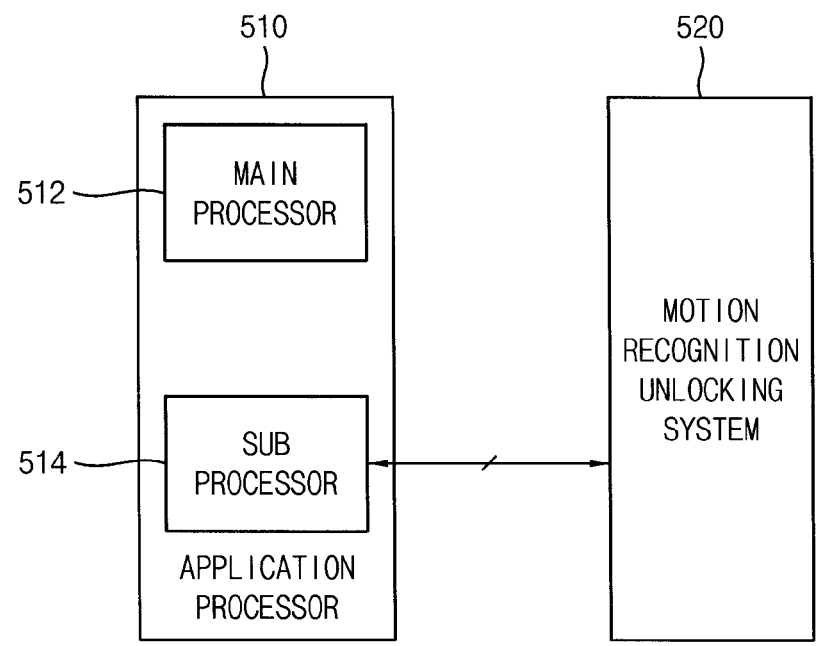
FIG. 19 is a block diagram of another example of the motion recognition unlocking system of the electronic device of FIG. 13 and illustrating an active mode of the system.

FIG. 17 is a block diagram illustrating an example in which a motion recognition unlocking system is controlled in a sleep mode of the electronic device of FIG. 13. FIG. 18 is a block diagram illustrating an example in which a motion recognition unlocking system is controlled in an active mode of the electronic device of FIG. 13. FIG. 19 is a block diagram illustrating another example in which a motion recognition unlocking system is controlled in an active mode of the electronic device of FIG. 13.

FIGS. 17 through 19 illustrate that the motion recognition unlocking system 520 is controlled by the main processor 512 or the sub processor 514 of the application processor 510 according to operating modes of the electronic device 500. As illustrated in FIG. 17, the motion recognition unlocking system 520 may be controlled by the sub processor 514 (i.e., a low performance processor) in the sleep mode of the electronic device 500. As described above, since the motion recognition unlocking system 520 performs an unlocking operation based on motion recognitions for the electronic device 500 in a simplified way, the calculations required to perform the unlocking operation for the electronic device 500 may be relatively few. That is, when the motion recognition unlocking system 520 operates in the sleep mode of the electronic device 500, the main processor 512 (i.e., a high performance processor) for performing main functions of the electronic device 500 is not required to operate. Thus, the main processor 512 may be powered-off in the sleep mode of the electronic device 500. In the example illustrated in FIG. 18, only the main processor 512 may operate in the active mode of the electronic device 500. In this case, the main processor 512 may perform sub functions of the electronic device 500 (e.g., control the motion recognition unlocking system 520) as well as the main functions of the electronic device 500. In another example as illustrated in FIG. 19, both the main processor 512 and the sub processor 514 may operate in the active mode of the electronic device 500. In this case, the main processor 512 may perform the main functions of the electronic device 500, and the sub processor 514 may perform the sub functions of the electronic device 500 (e.g., control the motion recognition unlocking system 520). That is, the main processor 512 and the sub processor 514 may perform role allocation in the active mode of the electronic device 500. Because the motion recognition unlocking system 520 is controlled by the sub processor 514 in the sleep mode of the electronic device 500, unnecessary power consumption may be prevented (or reduced) in the sleep mode of the electronic device 500. Finally, in this respect, although the application processor 510 has been described as including the main processor 512 and the sub processor 514, such a description merely conveys that the application processor 510 may have any configuration that allows it to operate in a high performance mode or in a low performance mode.

Figure 20:
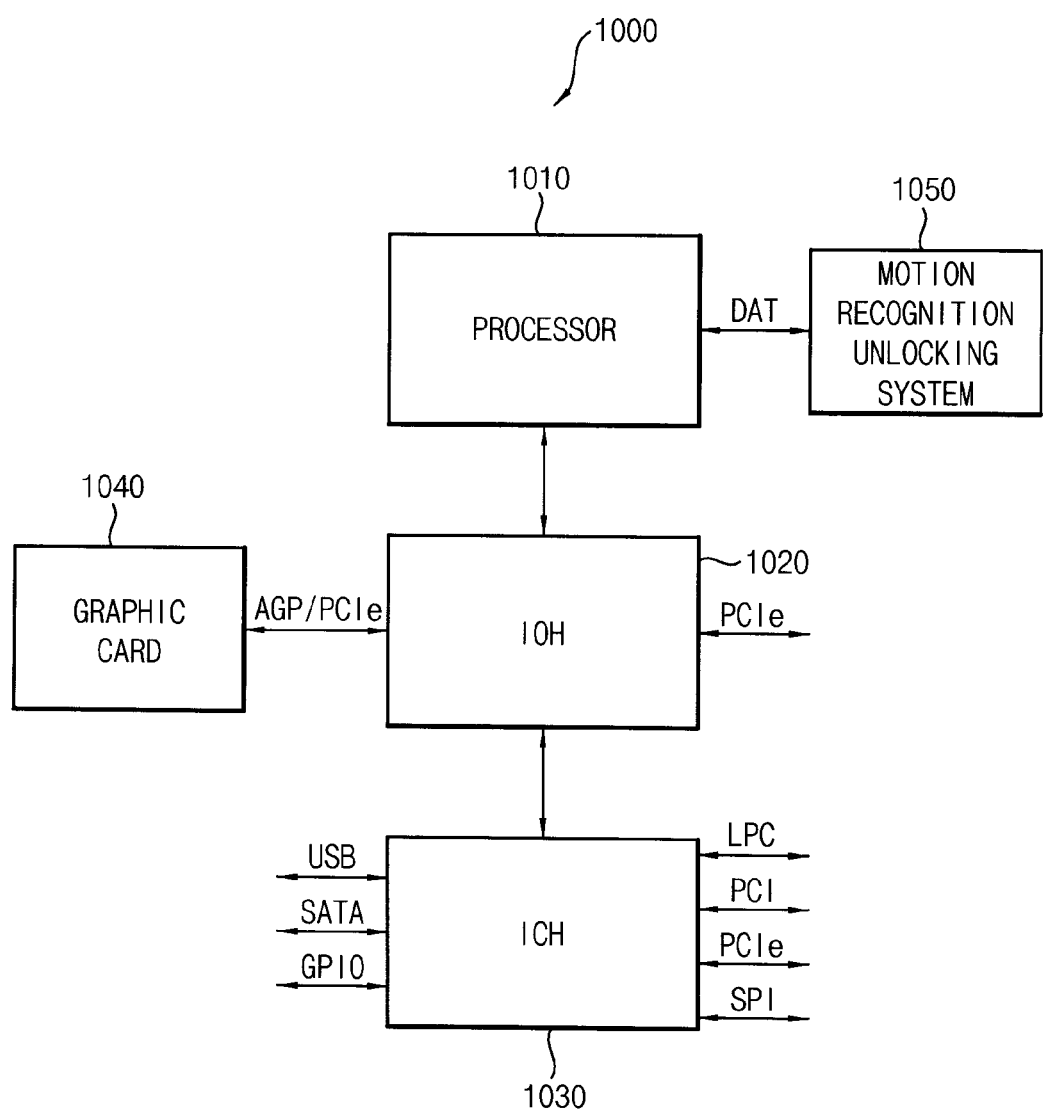
FIG. 20 is a block diagram illustrating a computing system according to the inventive concept.

FIG. 20 is a block diagram illustrating a computing system according to the inventive concept. The computing system may be a personal computer, a server computer, a workstation, a laptop or the like.

Referring to FIG. 20, the computing system 1000 may include a processor 1010, an input/output hub (IOH) 1020, an I/O controller hub (ICH) 1030, a graphics card 1040, and a motion recognition unlocking system 1050.

The processor 1010 performs various computing functions. For example, the processor 1010 may be a microprocessor, a central process unit (CPU) or the like. The processor 1010 may include a single core or multiple cores such as a dual-core processor, a quad-core processor, or a hexa-core processor. The processor 1010 may further include an internal or external cache memory. The I/O hub 1020 may manage data transfer operations between the processor 1010 and devices such as the graphics card 1040. The I/O hub 1020 may be coupled to the processor 1010 based on various interfaces. For example, the interface between the processor 1010 and the I/O hub 1020 may be a front side bus (FSB), a system bus, a HyperTransport, a lightning data transport (LDT), a QuickPath interconnect (QPI), or a common system interface (CSI). Furthermore, the I/O hub 1020 may provide any of various interfaces with the devices. For example, the I/O hub 1020 may provide an accelerated graphics port (AGP) interface, a peripheral component interface-express (PCIe), or a communications streaming architecture (CSA) interface.

The graphics card 1040 may be coupled to the I/O hub 1020 via AGP or PCIe for controlling a display (not shown) to display an image. The graphics card 1040 may include an internal processor for processing image data. The I/O hub 1020 may include an internal graphics device instead of the graphics card 1040. In this case, the graphics device of the I/O hub 1020 may be what is known as integrated graphics. Furthermore, the I/O hub 1020 including the internal memory controller and the internal graphics device may be realized by what is known as a graphics and memory controller hub (GMCH). The I/O controller hub 1030 may perform data buffering and interface arbitration operations to efficiently operate various system interfaces. The I/O controller hub 1030 may be coupled to the I/O hub 1020 via an internal bus such as a direct media interface (DMI), a hub interface, an enterprise Southbridge interface (ESI), or a PCIe. The I/O controller hub 1030 may interface with peripheral devices. For example, the I/O controller hub 1030 may provide a universal serial bus (USB) port, a serial advanced technology attachment (SATA) port, a general purpose input/output (GPIO), a low pin count (LPC) bus, a serial peripheral interface (SPI), PCI, or a PCIe.

The motion recognition unlocking system 1050 may be of a type described above with reference to FIG. 9 and thus, will not be described in detail again for the sake of brevity.

The present inventive concept may be applied to any electronic device that may benefit from having an unlocking function. For example, the present inventive concept may be employed by a computer, a laptop, a digital camera, a video camcorder, a function cell phone, a smart phone, a video phone, a smart pad, a tablet PC, an MP3 player, or a navigation system. And, although embodiments of the inventive concept and examples thereof have been described above in detail, the inventive concept may be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiment and examples described above but by the following claims.

What is claimed is:

1. A method of unlocking an electronic device based on motion recognition, the method comprising:
    generating motion information by optically detecting motion created by a user in a field of view of the device;
    calculating optical flows, of the motion created by the user in the field of view of the device, by performing an operation on the motion information, wherein each of the calculated optical flows contains information of a direction in which the motion is proceeding at a respective point in time;
    converting the optical flows into a code by sorting and grouping the optical flows based on a set of reference directions defined by spatial coordinates in the field of view, wherein optical flows containing similar information are grouped together;

generating a comparison result indicating whether the code is consistent with a predetermined password by comparing the code with the password; and determining whether to unlock the electronic device based on the comparison result, wherein the password corresponds to information in which the reference directions are arranged in a sequence of times, and wherein converting the optical flows into the code includes:

assigning sub-codes to the optical flows based on the reference directions; and sorting and grouping the sub-codes including by sequentially arranging the sub-codes individually along a timeline.

2. The method of claim 1, wherein the motion information is generated as a stream of events or as series of frames.

3. The method of claim 2, wherein the motion information is represented as motion vectors, and the optical flows are calculated based on a vector operation between the motion vectors.

4. The method of claim 2, wherein the motion created by the user relative to an X-Y coordinate plane in the field of view is detected, and the reference directions include at least two of an X-axis direction in the X-Y plane, a Y-axis direction in the X-Y plane, a diagonal direction in the X-Y plane, a rotational direction in the X-Y plane, and a Z-axis direction perpendicular the X-Y plane.

5. The method of claim 1, wherein generating the comparison result includes: generating a sequence comparison result by comparing a sequence of the code with a sequence of the password; generating a synchronicity comparison result by comparing a synchronicity of the code with a synchronicity of the password; and generating a first comparison result indicating that the code is consistent with the password or a second comparison result indicating that the code is inconsistent with the password based on the sequence comparison result and the synchronicity comparison result.

6. The method of claim 5, wherein generating the first comparison result or the second comparison result includes:

generating the first comparison result when the sequence comparison result is greater than a sequence-similarity reference value and the synchronicity comparison result is greater than a timing-similarity reference value; and generating the second comparison result when the sequence comparison result is smaller than the sequence-similarity reference value or the synchronicity comparison result is smaller than the timing-similarity reference value.

7. The method of claim 5, wherein determining whether to unlock the electronic device based on the comparison result includes:

determining to unlock the electronic device when the comparison result is the first comparison result; and determining not to unlock the electronic device when the comparison result is the second comparison result.

8. A method of unlocking an electronic device based on motion recognition, the method comprising:

generating motion information by optically detecting motion created by a user in a field of view of the device;

calculating optical flows, of the motion created by the user in the field of view of the device, by performing an operation on the motion information, wherein each of the calculated optical flows contains information of a direction in which the motion is proceeding at a respective point in time;

converting the optical flows into a code by sorting and grouping the optical flows based on a set of reference directions defined by spatial coordinates in the field of view, wherein optical flows containing similar information are grouped together;

generating a comparison result indicating whether the code is consistent with a predetermined password by comparing the code with the password; and determining whether to unlock the electronic device based on the comparison result, wherein the password corresponds to information in which the reference directions are arranged in a sequence of times, and wherein converting the optical flows into the code includes:

assigning sub-codes to the optical flows based on the reference directions; and sorting and grouping the sub-codes including by temporally correlating the sub-codes, by spatially correlating the sub-codes, or by temporally and spatially correlating the sub-codes, and sorting and grouping the sub-codes including by sequentially arranging the correlated sub-codes individually along a timeline.

9. A motion recognition unlocking system comprising:

a sensor unit comprising an optical sensor having a field of view, and configured to generate motion information by detecting motion created by a user in the field of view;

an optical flow calculation unit configured to calculate optical flows, of the motion created by the user in the field of view of the optical sensor, by performing an operation on the motion information such that each of the calculated optical flows contains information of a direction in which the motion is proceeding at a respective point in time;

a code generation unit configured to convert the optical flows into a code by sorting and grouping the optical flows based on a set of reference directions defined by spatial coordinates in the field of view, including by grouping optical flows containing similar information together;

a password storage unit configured to store a password corresponding to information in which the reference directions are arranged along a timeline;

a comparison unit configured to generate a comparison result indicating whether the code is consistent with the password by comparing the code with the password; and a control signal generation unit configured to output an unlocking control signal based on the comparison result, the unlocking control signal indicating whether to unlock an electronic device, wherein the code generation unit assigns sub-codes to the optical flows based on the predetermined reference directions, temporally correlates the sub-codes, spatially correlates the sub-codes, or temporally and spatially correlates the sub-codes, and arranges the correlated sub-codes along a timeline.

10. The system of claim 9, wherein the optical sensor is a time based optical sensor or a frame based optical sensor.

11. The system of claim 9, wherein the optical flow calculation unit calculates the optical flows based on a vector operation between motion vectors representative of the motion information.

12. The system of claim 9, wherein the comparison unit generates a sequence comparison result by comparing a sequence of the code with a sequence of the password, generates a timing comparison result by comparing a synchronicity of the code with a synchronicity of the password, and generates a first comparison result indicating that the code is consistent with the password or a second comparison result indicating that the code is inconsistent with the password based on the sequence comparison result and the synchronicity comparison result.

13. The system of claim 12, wherein the comparison unit generates the first comparison result when the sequence comparison result is greater than a sequence-similarity reference value and the synchronicity comparison result is greater than a timing-similarity reference value, and wherein the comparison unit generates the second comparison result when the sequence comparison result is smaller than the sequence-similarity reference value or the synchronicity comparison result is smaller than the timing-similarity reference value.

14. The system of claim 13, wherein the control signal generation unit outputs a first unlocking control signal for controlling the electronic device to be unlocked when the comparison result is the first comparison result, and wherein the control signal generation unit outputs a second unlocking control signal for controlling the electronic device not to be unlocked when the comparison result is the second comparison result.

* * * * *